Sept. 8, 1964 L. W. BAHE 3,148,091

METHOD OF MANUFACTURING RECTIFYING DEVICES

Original Filed Aug. 21, 1957

Inventor
Lowell W. Bahe
by Richard R. Mybeck
Attorney

United States Patent Office 3,148,091
Patented Sept. 8, 1964

3,148,091
METHOD OF MANUFACTURING RECTIFYING DEVICES

Lowell W. Bahe, Milwaukee, Wis., assignor to Allis-Chalmers Manufacturing Company, Milwaukee, Wis.
Original application Aug. 21, 1957, Ser. No. 679,505. Divided and this application Nov. 25, 1960, Ser. No. 71,599
4 Claims. (Cl. 148—1.5)

Figure 1:
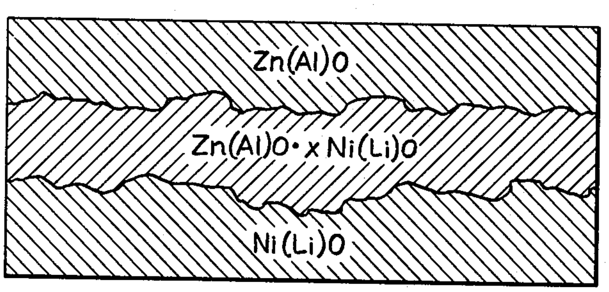

This invention relates generally to rectifying devices and more particularly to an improved method of manufacturing such devices from p-type and n-type oxidic semiconductor materials which devices are found to have remarkable and totally unexpected rectification properties.

This application is divisional from my co-pending application Serial No. 679,505, now abandoned, filed August 21, 1957.

It is known that a rectifying effect may be produced at a p-n junction between two semiconducting oxides. Generally speaking, such junctions are produced by abutting a layer of the p-type oxidic material with a layer of the n-type oxidic material and maintaining the materials in this relationship along a common and continuous border or interface. Usually the junction is formed by simply pressing the two oxidic layers together, although resins and like materials have been employed to a limited degree to "glue" the oxidic layers together.

The p-n junction thus formed presents a low resistance to current flow in one direction and a high resistance to current flow in the other direction across the junction or interface between the semiconducting oxides.

The present invention is predicated upon my discovery that a remarkably improved rectifier can be obtained by using a method of manufacture which eliminates the interface between the engaged n-type and p-type semiconducting oxides and which, in its stead, creates an integral assembly having adjacent portions of the p-type and n-type semiconducting oxidic layers literally fused one into the other to define a region of intermixture between non-reacted portions of the layers.

The present invention is further predicated upon my discovery that this fused region of intermixture can be formed either between two pure semiconducting oxides, between two additive-type semiconducting oxides, that is, oxides into which various preselected additives have been incorporated, or between a pure semiconducting oxide and an additive-type semiconducting oxide.

The formation of a rectifier from two semiconductor oxides, however, presents many problems. For example, the rectifier thus formed must include good electrical contact betweeen the semiconducting oxides if it is to perform in the desired fashion.

Furthermore, the relatively thin layers, which establish the zones of n-type and p-type conductivity, must be capable of withstanding appreciable mechanical and thermal stress.

Still further, the rectifying effect of the device should not be impaired by temperature changes so that the rectifier formed can be used under a variety of temperature conditions.

From a standpoint of economy, it is further desirable that the control of the manufacture of the device not be exceedingly critical and that materials may be used in its manufacture which are relatively inexpensive and readily available.

Accordingly, one of the principal objects of the present invention is to provide a method of manufacturing a rectifying device which fulfills all of the aforestated desiderata.

Another object of the present invention is to provide a method of manufacturing an improved rectifying device in which the formation of single crystals is eliminated and layers of semiconducting materials of extremely large areas may be employed.

Still another object of the present invention is to provide an improved method of manufacturing rectifying devices in which a layer of p-type semiconducting oxide and a layer of an n-type semiconducting oxide are engaged, heated to a temperature sufficient to fuse a portion of said layers, one into the other, to form an intermixed region therebetween instead of the line of demarcation heretofore characteristic of this type of device.

Figure 2:
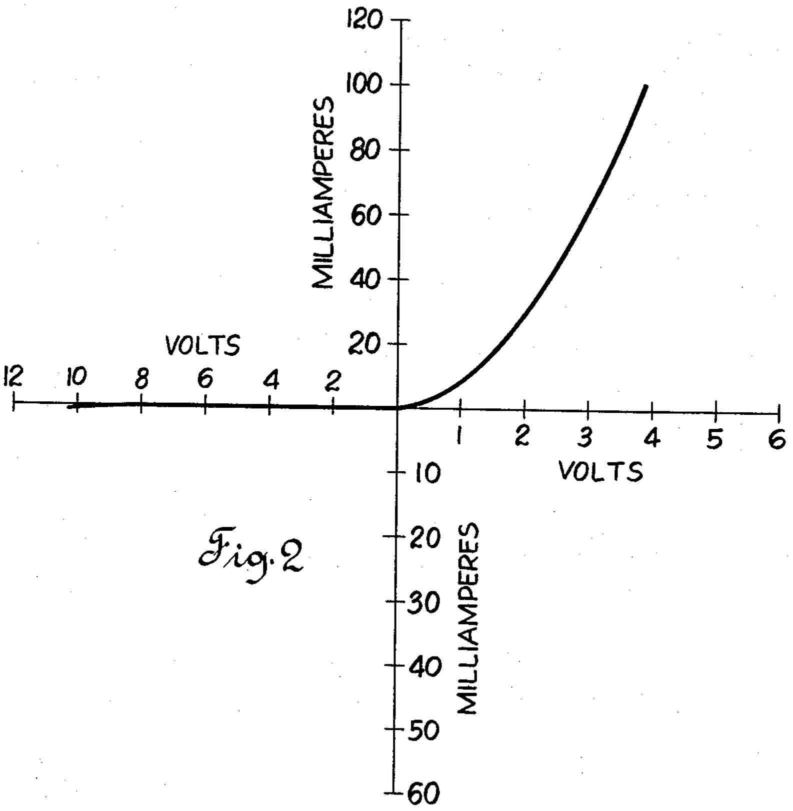

These and still further objects, as shall hereinafter appear, are fulfilled by the present invention in a remarkably unexpected fashion as may be discerned from the following detailed description of certain exemplary embodiments of the present invention, especially when considered in conjunction with the accompanying drawings in which:

FIG. 1 is a sectional veiw of a rectifying device illustrating an exaggerated arrangement of the regions formed in accordance with the practice of the present invention; and FIG. 2 is a curve of the static volt-milliampere characteristic of a rectifying device manufactured in accordance with the present invention.

One practice of the present invention in which a rectifying device, such as illustrated in FIG. 1, might be manufactured shall now be described.

A suitable metal supporting plate (not shown) is provided with a polished nickel surface. Extremely desirable results are obtained using a supporting plate of pure nickel although any of the known electrical conductors, which will take a nickel plate by electrodisposition, chemical deposition or like techniques, may be used. Thus, in the following description, the term "nickel surface" shall be used to define both a surface of a supporting plate of pure nickel and a nickel plated surface on a supporting plate capable of being nickel plated.

The nickel surface of the supporting plate is then heated to a temperature of about 100 to 150° C. where, according to the preferred practice of this invention, the heated plate is sprayed or otherwise suitably coated with a mixture of lithium hydroxide and a volatile medium, such as water. A mixture containing ten percent by weight lithium hydroxide gives good results. As this mixture is applied to the hot nickel surface, as with an atomizer, the volatile medium is evaporated and a thin uniform layer of lithium hydroxide is deposited over the nickel. A layer consisting of from about one to about five milligrams of lithium hydroxide for each square centimeter of surface area is preferred.

The supporting plate with the lithium hydroxide coating is then heated in an air oven to a temperature of about 900 to 1100° C. for about ten minutes whereupon nickel oxide and lithium oxide are formed on the supporting plate as a single adherent layer of nickel (lithium) oxide having a blackish color. The time of heating of course varies with the temperature selected although the formation of the blackish oxide is a reliable indication that the heating operation is complete.

Next, the nickel (lithium) oxide layer is brought to a temperature of about 100 to 150° C. and is sprayed or otherwise coated with a mixture of finely ground zinc oxide and a volatile medium, such as water, containing about ten percent zinc oxide by weight. Again, the volatile medium is evaporated by the heat of the plate which is at a temperature slightly above the boiling temperature of the volatile medium. The spraying is continued until a substantially uniform layer, containing about two to about fifteen milligrams of zinc oxide for each square centimeter of sprayed surface area, is formed.

Next, portions of the zinc oxide and nickel (lithium) oxide layers adjacent each other are fused, one into the other, by heating the layers to a temperature of from 400 to 1100° C. whereupon a central region of intermixture is formed disposed intermediate of those portions of the layers remote from the other layer. The time of heating is, of course, dependent upon the specific temperature selected. This heating may taken place in air or a reducing atmosphere with equally satisfactory results.

Another practice for manufacturing a rectifying device in accordance with the present invention comprises forming each layer by compacting its respective powdered oxide into the desired shape and then sintering the compacted shape in a furnace. If additives are desired, as discussed, they may be added by mixing them with the nickel oxide and zinc oxide powders prior to compacting. The preferred additive for the nickel oxide is lithium oxide whereas the preferred additive for the zinc oxide is alumina.

It is found that a powder mix containing from two to ten mole percent of lithium oxide and a remainder of nickel oxide provides a satisfactory semiconducting material. The mix can be prepared in a mortar with a pestle or with any other well known device for mixing powders. The powder mix was then formed into a desired shape as with a hydraulic press operating at about 10,000 p.s.i. and the shape was fired at about 1000° C. for approximately 100 minutes to provide an adherent sintered shape.

An adherent sintered shape is similarly formed from a mix containing zinc oxide with from one to five mole percent of alumina uniformly mixed therewith.

After the sintered shapes are formed, one zinc (aluminum) oxide shape (usually a thin plate) and one nickel (lithium) oxide shape (likewise usually a thin plate) are brought into planar engagement with each other to form a sandwich.

The sandwich, with planar engagement in tack, is next fed into a suitable furnace where the sandwich is heated to a temperature of about 900 to 1100° C. for about ten minutes.

During this heat, the portions of the shapes adjacent to the engagement fuse one into the other to define a central region of intermixture intermediate between a strata of zinc (aluminum) oxide and a strata of nickel (lithium) oxide defined by the unreacted portions of the layers, that is, the portions of the layers remote of the engagement (see FIG. 1).

Another practice of the present invention shall now be described whereupon procedures employed above are, in part, combined.

A rectangular shaped nickel supporting plate, approximately 0.5 inch in length and 0.5 inch wide, is polished on one surface to obtain a smooth finish. This plate is then heated to a temperature of approximately 100 to 150° C. and a lithium hydroxide distilled water mixture (ten percent by weight LiOH) is sprayed on the surface with an atomizer. As the fine atomized spray contacts the heated metallic surface, the water evaporates and a uniform white layer of lithium hydroxide is formed on the surface. The spraying is continued until about three to four milligrams of lithium hydroxide are deposited for each square centimeter of surface.

The supporting plate, with the lithium hydroxide coating, is then heated in an air oven for about ten minutes at a temperature of about 1000° C. whereupon the adherent layer of blackish nickel (lithium) oxide is formed on the nickel plate.

The nickel (lithium) oxide layer if next brought to a temperature of about 100 to 150° C. and then sprayed with a mixture of finely ground zinc (aluminum) oxide and water (ten percent oxide by weight).

This finely ground zinc (aluminum) oxide is prepared by compacting a mixture of the powders of zinc oxide and alumina (about one to five mole percent alumina) at 10,000 p.s.i., sintering the compact at about 1000° C. for ten minutes, cooling the fired compact, pulverizing the cooled compact and mixing the finely ground particles with water.

The spraying is continued until a substantially uniform layer of zinc (aluminum) oxide, comprising about ten milligrams per square centimeter of surface area, is deposited upon the nickel (lithium) oxide surface.

Next, the plate is heated for a period at a temperature of from 400 to 1100° C. whereupon adjacent portions of the nickel (lithium) oxide and zinc (aluminum) oxide layers fuse, one into the other, to produce a central region of intermixture disposed between strata of each defined by the nonreacting portions of the layers. The time of the heating will vary from ten minutes to about twenty-four hours, depending upon the temperature selected.

In order to determine the electrical characteristics of the rectifying device formed by the nickel oxide, intermixed region, and zinc oxide according to the present invention, a static voltage was impressed across the device. Electrical connection is made in any well known fashion, the use of tungsten probes being found to give satisfactory results. Current readings (in milliamperes) were taken as the voltage was varied. The connections across the device were reversed to obtain the reverse current values. The results of these measurements are reported in FIG. 2. Voltage breakdown was also measured by raising the potential in the reverse direction until failure occurred and was found to occur at about 50 to 150 volts.

From the foregoing it becomes apparent that a novel and highly useful method of manufacturing rectifying devices has been described which significantly advances the art to which it pertains and fulfills all of the aforestated objectives in a remarkably unexpected fashion.

It is, of course, understood that the several examples and embodiments herein described and illustrated are intended to exemplify the present invention rather than limit it and that all modifications, alterations and applications falling within the spirit of this invention, especially as defined by the appended claims, are intended within its scope.

What is claimed is:

1. The method of manufacturing a rectifying device comprising: forming a polished nickel surface upon a supporting plate; depositing upon said surface a uniform layer of from about one to about five milligrams of lithium hydroxide per square centimeter of said surface; oxidizing said surface and said lithium hydroxide to form a layer of nickel (lithium) oxide; depositing upon said layer a uniform layer of from about two to about fifteen milligrams of zinc oxide per square centimeter of said surface; heating said layers to a temperature of from about 400 to about 1100° C. whereupon the portions of said layers adjacent each other fuse one into the other to form an integral member having a region of intermixture disposed intermediate of portions of said layers remote from each other; and cooling said member.

2. The method of manufacturing a rectifying device comprising: forming a polished nickel surface upon a supporting plate; depositing upon said surface a uniform layer of from about one to about five milligrams of lithium hydroxide per square centimeter of said surface; oxidizing said surface and said lithium hydroxide to form a layer of nickel (lithium) oxide; depositing upon said layer, for each square centimeter of surface area thereof, a uniform layer of about two to about fifteen milligrams of a mixture of zinc oxide with one to to five mole percent of alumina; heating said layers to a temperature of from about 400 to about 1100° C. whereupon the portions of said layers adjacent each other fuse one into the other to form an integral member having a region of intermixture disposed intermediate of portions of said layers remote from each other; and cooling said member.

3. The method of manufacturing a rectifying device comprising: forming a layer of nickel oxide; heating said layer to a temperature of 100 to 150° C.; spraying said layer with a mixture containing lithium hydroxide in a volatile medium to form a layer of lithium hydroxide upon said layer of nickel oxide; heating said layers to 900 to 1100° C. to form a single layer of nickel (lithium) oxide; bringing said layer of nickel (lithium) oxide to a temperature of 100 to 150° C.; spraying said layer with a mixture containing zinc and aluminum oxides in a volatile medium; heating said layers to a temperature of 400 to 1100° C. while portions of said layers adjacent said engagement fuse one into the other to form an integral member having a region of intermixture disposed intermediate of portions of said layers remote to said engagement; and cooling said member.

4. A method of manufacturing a rectifying device comprising: admixing powdered nickel oxide with about two to ten mole percent of powdered lithium oxide to form a first substantially homogeneous mixture; admixing powdered zinc oxide with about one to five mole percent of powdered aluminum oxide to form a second substantially homogeneous mixture independent of said first mixture; compacting each of said independent mixtures into independent shapes; sintering each of said shapes at a temperature of 900 to 1100° C. to form first and second independent sintered bodies consisting respectively of said first and second mixtures; engaging said first and second sintered bodies into a physically contacting mechanically disjoined member; heating said member to a temperature of from about 400 to about 1100° C. while the portions of said bodies adjacent each other fuse one into the other to form an integral member having a region of intermixture disposed intermediate of portions of said bodies remote from each other; and cooling said member.

References Cited in the file of this patent

UNITED STATES PATENTS

| | | |
|---|---|---|
| 2,622,116 | Maize | Dec. 16, 1952 |
| 2,887,632 | Dalton | May 19, 1959 |
| 2,887,633 | Shilliday et al. | May 19, 1959 |

OTHER REFERENCES

Philips Research Reports No. 5, pages 173–187, dated 1950.

Physica, volume XVIII, No. 8, August 1951, pages 761–776.